Nov. 8, 1966   U. SAFTIEN   3,284,143
BRAKE VALVE STRUCTURE
Filed Dec. 3, 1964
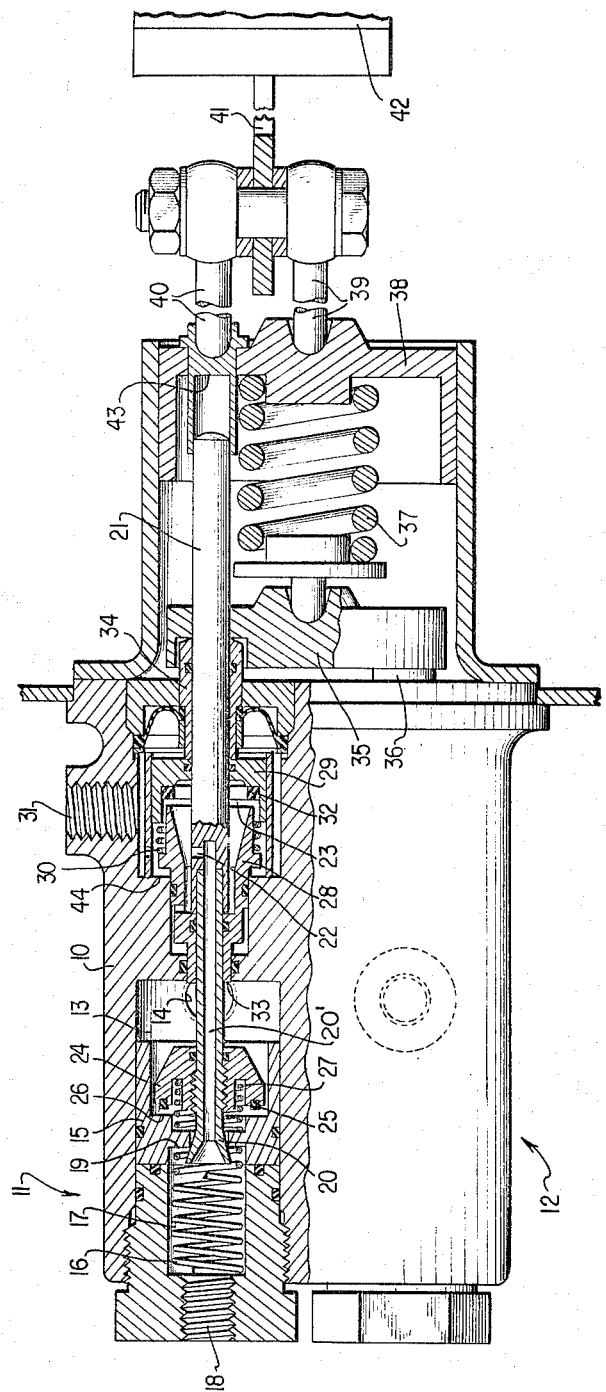
INVENTOR.
UDO SAFTIEN
BY Dicke & Craig
ATTORNEYS

3,284,143
BRAKE VALVE STRUCTURE
Udo Saftien, Waiblingen, Germany, assignor to Daimler-Benz Aktiengesellschaft, Stuttgart-Untertürkheim, Germany
Filed Dec. 3, 1964, Ser. No. 415,662
11 Claims. (Cl. 303—54)

The present invention relates to a brake valve for hydraulic brake actuating installations, especially for motor vehicles, including a piston slide member acted upon on one end face thereof by the accumulator- or servo-tank pressure and delimiting with the other side thereof a space in communication with the pressure line leading to the wheel brake cylinders, which piston slide member is adapted to be displaced in case of absence or failure of the accumulator- or servo-pressure by the brake-valve actuating member in order to produce a brake pressure in the pressure line leading to the wheel brake cylinders. With a known brake valve of this type the piston slide member is disposed during normal braking by the accumulator- or servo-pressure already in the starting position for the production of brake pressure by the piston slide member in case of auxiliary or emergency braking. This has as consequence that additional space has to be provided at the brake pedal additional to the normal brake stroke for the relatively large stroke during auxiliary or emergency braking and that the operator has to keep his foot during braking with accumulator or servo-pressure in a completely different position than during braking with pressure production by the piston slide member. In contradistinction thereto, it is the aim of the present invention to create a brake valve of the type mentioned hereinabove in which the auxiliary or emergency braking without accumulator- or servo-pressure can be realized with approximately the same brake pedal path as with the normal braking by means of the accumulator- or servo-pressure. This is achieved in that the piston slide member is loaded or acted upon in one direction by the accumulator- or servo-pressure and in the other by the force of a spring in such a manner that the piston slide member in case of disappearance or failure of the accumulator or servo-pressure is brought by the spring into the starting position for the brake pressure production. In this manner with slight constructional expenditures, there is created the possibility to replace the missing accumulator or servo-pressure by a mechanical pressure production on the part of the driver and to avoid thereby with the aid of an automatic mechanism controlled by the accumulator or servo-pressure lost-motion or idling paths of the brake valve-actuating member, that is, for example of the brake pedal. The operator has to employ, in case of failure of the accumulator or servo-system, only a larger force for the attainment of a predetermined braking effect.

The construction of the brake valve becomes particularly simple if the parts and elements for the normal braking with the aid of the accumulator or servo-pressure and for the auxiliary or emergency braking in case of failure of the servo-pressure are combined in such a manner that the piston slide member pressed against an abutment by the accumulator or servo-pressure carries simultaneously the valve seat for the valve closure member controlling the inlet or admission of the pressure medium to the pressure line leading to the wheel brake cylinders. The arrangement may thereby be made in such a manner that the stem of the valve closure member extends through the piston slide member while leaving an annular space in communication with the accumulator or servo-tank and the valve closure member is pressed against its seat opposite the inflow direction of the pressure medium coming from the accumulator or servo-tank.

A further simplification (by combining two functions in a single member) can be achieved in that the valve closure member serves as a push member during the auxiliary or emergency braking. In particular it is proposed in connection therewith that the valve closure member carries at its stem an abutment which, after a certain relative movement between valve the closure member and the piston slide member exceeding the normal opening path, sealingly abuts against the end face of the piston slide member loaded by the accumulator or servo-pressure and thus in case of failure of the accumulator or servo-pressure may serve for the transmission of the movement and of the force of the brake-valve actuating member to the piston member.

Accordingly, it is an object of the present invention to provide a brake valve assembly of the type described above which eliminates by simple means the aforementioned disadvantages encountered with the prior art constructions.

Another object of the present invention resides in the provision of a brake valve assembly operable either by servo-pressure or by externally applied mechanical force which obviates the need for any additional relatively large stroke during emergency braking when servo-pressure is absent.

Another object of the present invention resides in the provision of a brake valve assembly for the hydraulic brake actuating installation of motor vehicles which eliminates the need for holding the driver's foot in different positions when operating the brake either in the presence or in the absence of servo-pressure.

Still another object of the present invention resides in the provision of a brake valve mechanism which is simple in construction and easy to assemble, and which utilizes the servo-pressure or absence thereof to automatically assist in readying the brake system for mechanical actuating in case of failure of the servo-pressure.

Still another object of the present invention resides in the provision of a brake valve assembly of the type described above which makes possible a simpler and more reliable operation of the brake system for emergency braking in case of failure of the servo-pressure.

These and other objects, features and advantages of the present invention will become more obvious from the following description when taken in connection with the accompanying drawing which shows in the single figure thereof, for purposes of illustration only, one embodiment in accordance with the present invention, the single figure being a longitudinal cross sectional view through a brake valve which is intended for the front wheel brakes of a passenger motor vehicle and which is assembled with a second brake valve for the rear wheel brakes connected with a second independent pressure medium system.

Referring now more particularly to the drawing, reference numeral 10 designates therein the common housing within which are accommodated the brake valves generally designated by reference numerals 11 and 12 for the front wheel brakes and the rear wheel brakes, respectively. In the illustrated embodiment, only the brake valve 11 for the front wheels is equipped with an auxiliary or emergency brake system in case of failure of the accumulator or servo-pressure. Of course, a similar emergency brake system could also be provided for the brake system of the rear wheels.

A piston slide member 15 is adapted to slide within a cylinder space 13 which is connected by way of a supply line 14 with a conventional accumulator or servo-tank (not shown) for the hydraulic pressure medium. Normally, the piston slide member 15 is pressed toward the left by the servo-pressure prevailing in space 13 against the force of a compression spring 16 into the illustrated abutment position thereof. The spring 16 is disposed in a space 17. The pressure line 18 leads from space 17 to the front wheel brake cylinders (not shown) of conventional construction.

The piston slide member 15 carries or forms the seat 19 for the closure member 20 of the control valve. The hollow stem portion 20' of the valve closure member 20 is pressed into an auxiliary actuating rod 21. The interior space of the valve closure member 20 is in commnuciation by way of a bore 22 with the space 23 surrounding the auxiliary actuating rod 21. An abutment member 24 is threadably secured on the stem 20' of the valve closure member 20; the abutment 24 carries at the side facing the valve seat a seal 25 by means of which it is able to abut against an end-face abutment surface 26 of the piston slide member 15. Normally the abutment 24 is pressed toward the right by a compression spring 27 whereby also the closure valve member 20 is pressed correspondingly against its seat 19.

Two sleeves 28 and 29 are slidably arranged within the housing 10 on the unit constituted by the closure-valve member 20, and the auxiliary actuating-rod 21. A compression spring 30 is disposed between the two sleeves 28 and 29. An annular gap formed between the sleeves 28 and 29 normally establishes communication between the space 23 and a return line 31 leading to the customary pressure medium supply or storage tank (not shown). This connection is interrupted if, as a result of an axial movement of the two sleeves 28 and 29 relative to one another, the right end of the sleeve 28 is pressed against a seal 32 secured at the sleeve 29. The sleeve 28 abuts in the position illustrated in the drawing against the left, collar-like end of the auxiliary actuating rod 21 and protrudes with a cross sectional surface 33 into the space 13. The cross sectional surface 33 is of the same size as that surface with which the accumulator or servo-pressure within the space 13 loads or acts upon the valve closure member 20 in the closed position from the right thereof in proximity to the valve seat 19 so that in the presence of servo-pressure, the parts 20, 21, and 28 can be considered as rigidly connected with one another.

The sleeve 29 is operatively connected by way of an actuating sleeve or bushing 34 with a scale-beam like member 35 whose other end serves for the actuating of a corresponding sleeve or bushing 36 of the second brake valve 12. The scale-beam like member is loaded by the pressure of a spring 37 which abuts against a piston-like slide member 38. The brake force is introduced and applied from the brake-valve actuating member 41 to this member 38 by way of two plungers 39 and 40. The member 41 is operatively connected in any appropriate manner with the brake pedal 42. The member 38 can fulfill under normal conditions, that is, in case of presence of accumulator or servo-pressure, the displacements necessary for the braking without ever causing abutment of the right end of the auxiliary actuating rod 21 against the surface 43.

OPERATION

Normal braking

A normal braking operation takes place in broad outline approximately as follows:

By depressing the brake pedal 42, the brake-valve actuating member 41 and therewith also the plungers 39 and 40 and the member 38 are moved toward the left. This movement has no effect on the auxiliary actuating rod 21 but has an effect on the spring 37 which is stressed corresponding to the pedal force. The force introduced into the spring 37 is transmitted to the scale-beam like member 35 which, in its turn, transmits the same to the actuating bushings 34 and 36. The bushing 34 displaces the sleeve 29 toward the left whereby the right end of the sleeve 28 is pressed against the seal 32 and thus the passage through the annular gap between the sleeves 28 and 29 is blocked or closed off. Hence, no pressure medium can any longer escape out of the line 18 and the space 17 by way of the hollow valve closure member 20 and bore 22 into the return line 31. Since the sleeve 28 is also moved toward the left by the sleeve 29, the valve closure member 20 also follows this movement because, as indicated above, the parts 20, 21, and 28 can be considered as rigidly connected with one another in the presence of servo-pressure. The servo-pressure now reaches from space 13 into the space 17 and by way of the line 18 to the front wheel brake cylinders. The pressure prevailing within the space 23 which corresponds to the pressure in the wheel brake cylinders, has a return effect on the sleeve 29 toward the right which leads to the result that upon attaining a predetermined pressure at the wheel brakes the sleeve 29 and therewith the valve closure member 20 again move back toward the right. The magnitude of the pressure prevailing at that instant in the wheel brake cylinders depends on the magnitude of the force introduced into the spring 37, that is, on the pedal force.

If the foot is now removed from the brake pedal 42, then the sleeve 29 is displaced toward the right by the brake pressure prevailing in space 23 to such an extent that the closure 32 is lifted (the valve closure member 20 and therewith also the sleeve 28 cannot follow any longer this movement toward the right by reason of the abutment at 19) and the brake pressure can again decrease by discharge of the pressure medium through the annular gap and the return line 31.

Emergency braking

If for any reason the accumulator or servo-pressure dissappears or fails, an auxiliary or emergency braking takes place in the following manner:

The spring 16 displaces the piston slide member 15 toward the right up to abutment thereof against the housing 10. The valve closure member 20 which now as before is pressed by the spring 27 against its seat 19, follows this movement toward the right and so does also the auxiliary actuating rod 21 rigidly connected with the valve closure member 20 which now is located with its right end very close in front of the surface 43. The sleeve 28 has no reason to follow this movement toward the right since no pressure exists and acts any longer on the left end face 33 thereof. If now the brake operation is initiated by the brake pedal 42, then on the one hand, exactly as with normal braking, the sleeve 29 is moved or displaced toward the left. The sleeve 29 also displaces toward the left the sleeve 28 until the latter comes into abutment against the housing 10 at 44. By reason of the pressure exerted on the sleeve 29, the two sleeves 28 and 29 are pressed against each other at 32 so that the space 23 is now again closed off with respect to the return line 31. However, simultaneously therewith, the rod 21 is also taken along toward the left by the surface 43, and therewith also the valve closure member 20. The abutment member 24 rigidly connected therewith also has moved toward the left and has now reached a sealing abutment against surface 26. The piston slide member 15 is therefore pressed toward the left so that a pressure builds up in front thereof within line 18 leading to the wheel brake cylinders which no longer can escape by reason of the seals 25 and 32. Hence, notwithstanding failure of the servo-pressure a braking is effected by a direct pressure production at least at the front wheels.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:
1. A brake valve for hydraulic brake actuating installations, especially motor vehicles, having a servo-pressure system with a pressure medium supply, comprising:
- housing means provided with port means for connection with the supply line leading to the pressure medium supply and with the pressure line leading said pressure medium to the wheel brake cylinders,
- piston means slidable within said housing means, said piston means being acted upon on one end face thereof by the pressure of said pressure medium and defining with the other end face thereof a space adapted to be connected with the pressure line leading to the wheel brake cylinders,
- actuating means operatively connected with said piston means for displacing said piston means only in case of failure of the servo-pressure to thereby produce a brake pressure in the pressure line,
- said piston means being normally loaded in one direction by the servo-pressure against a fixed abutment so as to remain stationary during normal operation of the brake valve when the servo-pressure exists,
- and spring means for loading the piston means in the opposite direction upon failure of the servo-pressure in such a manner that the piston means is axially displaced in said opposite direction by said spring means into the starting position for the production of braking pressure in case of failure of the servo-pressure.

2. A brake valve for hydraulic brake actuating installations, especially motor vehicles, having a servo-pressure system with a pressure medium supply, comprising:
- housing means provided with port means for connection with the supply line leading to the pressure medium supply and with the pressure line to the wheel brake cylinders,
- piston means slidable within said housing means, said piston means being acted upon on one end face thereof by the pressure of said pressure medium and defining with the other end face thereof a space adapted to be connected with the pressure line leading to the wheel brake cylinders,
- actuating means operatively connected with said piston means for displacing said piston means in case of failure of the servo-pressure to thereby produce a brake pressure in the brake line,
- said piston means being normally loaded in one direction by the servo-pressure.
- and spring means for loading the piston means in the opposite direction in such a manner that the piston means is effectively brought by said spring means into the starting position for the production of braking pressure in case of failure of the servo-pressure,
- closure valve means in said brake valve for controlling the flow of pressure medium to said pressure line,
- abutment means in said housing means, said piston means being normally pressed against said abutment means by the servo-pressure, and said piston means forming the valve seat for said closure valve means.

3. A brake valve for hydraulic brake actuating installations, especially motor vehicles, having a servo-pressure system with a pressure medium supply, comprising:
- housing means provided with port means for connection with the supply line leading to the pressure medium supply and with the pressure line to the wheel brake cylinders,
- piston means slidable within said housing means, said piston means being acted upon on one end face thereof by the pressure of said pressure medium and defining with the other end face thereof a space adapted to be connected with the pressure line leading to the wheel brake cylinders,
- actuating means operatively connected with said piston means for displacing said piston means in case of failure of the servo-pressure to thereby produce a brake pressure in the brake line,
- said piston means being normally loaded in one direction by servo-pressure,
- and spring means for loading the piston means in the opposite direction in such a manner that the piston means is effectively brought by said spring means into the starting position for the production of braking pressure in case of failure of the servo-pressure,
- closure valve means in said brake valve for controlling the flow of pressure medium to said pressure line,
- abutment means in said housing means, said piston means being normally pressed against said abutment means by the servo-pressure, and said piston means forming the valve seat for said closure valve means,
- said closure valve means including a stem portion extending through said piston means while leaving an annular space in communication with said first-mentioned space,
- and means for pressing said closure valve means against said valve seat in opposition to the direction of flow of the pressure medium supplied from the supply line.

4. A brake valve for hydraulic brake actuating installations, especially motor vehicles, having a servo-pressure system with a pressure medium supply, comprising:
- housing means provided with port means for connection with the supply line leading to the pressure medium supply and with the pressure line to the wheel brake cylinders,
- piston means slidable within said housing means, said piston means being acted upon on one end face thereof by the pressure of said pressure medium and defining with the other end face thereof a space adapted to be connected with the pressure line leading to the wheel brake cylinders,
- actuating means operatively connected with said piston means for displacing said piston means in case of failure of the servo-pressure to thereby produce a brake pressure in the brake line,
- said piston means being normally loaded in one direction by servo-pressure,
- and spring means for loading the piston means in the opposite direction in such a manner that the piston means is effectively brought by said spring means into the starting position for the production of braking pressure in case of failure of the servo-pressure,
- closure valve means in said brake valve for controlling the flow of pressure medium to said pressure line,
- abutment means in said housing means, said piston means being normally pressed against said abutment means by the servo-pressure, and said piston means forming the valve seat for said closure valve means,
- said closure valve means serving as push member for emergency braking.

5. A brake valve for hydraulic brake actuating installations, especially motor vehicles, having a servo-pressure system with a pressure medium supply, comprising:
- housing means provided with port means for connection with the supply line leading to the pressure medium supply and with the pressure line to the wheel brake cylinders,
- piston means slidable within said housing means, said piston means being acted upon on one end face thereof by the pressure of said pressure medium and defining with the other end face thereof a space adapted to be connected with the pressure line leading to the wheel brake cylinders,
- actuating means operatively connected with said piston means for displacing said piston means in case of failure of the servo-pressure to thereby produce a brake pressure in the pressure line, including a brake valve actuating member,
- said piston means being normally loaded in one direction by servo-pressure,
- and spring means for loading the piston means in the opposite direction in such a manner that the piston means is effectively brought by said spring means into the starting position for the production of braking pressure in case of failure of the servo-pressure, closure valve means in said brake valve for controlling the flow of pressure medium to said pressure line, abutment means in said housing means, said piston means being normally pressed against said abutment means by the servo-pressure, and said piston means forming the valve seat for said closure valve means, said closure valve means including a stem portion extending through said piston means while leaving an annular space in communication with said first-mentioned space, and means for pressing said closure valve means against said valve seat in opposition to the direction of flow of the pressure medium supplied from the supply line, said closure valve means having an abutment at the stem portion thereof which, upon relative movement between the closure valve means and the piston means exceeding the normal opening path, abuts sealingly against said one end face of the piston means and thus serves in case of failure of the servo-pressure for the transmission of the movement and of the force from the brake valve actuating member to said piston means.

6. A brake valve for hydraulic brake actuating installations, especially motor vehicles, having a servo-pressure system with a pressure medium supply, comprising:

housing means provided with port means for connection with the supply line leading to the servo-tank, with the pressure line leading to the wheel brake cylinders, and with the pressure medium return line, piston means slidable within said housing means, said piston means being acted upon on one end face thereof by the servo-pressure and defining with the other end face thereof a space adapted to be connected with the pressure line leading to the wheel brake cylinders, and actuating means operatively connected with said piston means for displacing said piston means in case of failure of the servo-pressure to thereby produce a brake pressure in the pressure line, said piston means being loaded in one direction by the servo-pressure, and spring means for loading the piston means in the opposite direction in such a manner that the piston means is effectively brought by said spring means into the starting position for the production of braking pressure in case of failure of the servo-pressure, closure valve means in said brake valve for controlling the flow of pressure medium to said pressure line including a hollow valve member, said closure valve means including also a stem portion extending through said piston means and normally leaving an annular space in communication with said first-mentioned space, said hollow valve member being in communication on one side thereof with said pressure line on the other side thereof with the pressure medium return line, said actuating means including an auxiliary actuating rod operatively connected with the end of the stem portion of said hollow valve member, two sleeve means surrounding said stem portion and actuating rod, means including said actuating rod for displacing said hollow valve member in its function as push member during emergency braking, and means including said two sleeve means for displacing said hollow valve member in its function as control valve.

7. A brake valve for hydraulic brake actuating installations, especially motor vehicles, having a servo-pressure system with a pressure medium supply, comprising:

housing means provided with port means for connection with the supply line leading to the servo-tank, with the pressure line leading to the wheel brake cylinders, and with the pressure medium return line, piston means slidable within said housing means, said piston means being acted upon on one end face thereof by the servo-pressure and defining with the other end face thereof a space adapted to be connected with the pressure line leading to the wheel brake cylinders, and actuating means operatively connected with said piston means for displacing said piston means in case of failure of the servo-pressure to thereby produce a brake pressure in the pressure line, said piston means being loaded in one direction by the servo-pressure, and spring means for loading the piston means in the opposite direction in such a manner that the piston means is effectively brought by said spring means into the starting position for the production of braking pressure in case of failure of the servo-pressure, closure valve means in said brake valve for controlling the flow of pressure medium to said pressure line including a hollow valve member, said closure valve means including also a stem portion extending through said piston means and normally leaving an annular space in communication with said first-mentioned space, said hollow valve member being in communication on one side thereof with said pressure line and on the other side thereof with the pressure medium return line, said actuating means including an auxiliary actuating rod operatively connected with the end of the stem portion of said hollow valve member, two sleeve means surrounding said stem portion and actuating rod, means including said actuating rod for displacing said hollow valve member in its function as push member during emergency braking, and means including said two sleeve means for displacing said hollow valve member in its function as control valve, said two sleeve means, upon axial loading thereof, interrupting by the seal means provided at the mutual contact surfaces thereof the connection of the hollow space within the valve member with the return line.

8. A brake valve for hydraulic brake actuating installations, especially motor vehicles, having a servo-pressure system with a pressure medium supply, comprising:

a housing means provided with port means for connection with the supply line leading to the servo-tank, with the pressure line leading to the wheel brake cylinders, and with the pressure medium return line, piston means slidable within said housing means, said piston means being acted upon on one end face thereof by the servo-pressure and defining with the other end face thereof a space adapted to be connected with the pressure line leading to the wheel brake cylinders, and actuating means operatively connected with said piston means for displacing said piston means in case of failure of the servo-pressure to thereby produce a brake pressure in the pressure line, said piston means being loaded in one direction by the servo-pressure, and spring means for loading the piston means in the opposite direction in such a manner that the piston means is effectively brought by said spring means into the starting position for the production of braking pressure in case of failure of the servo-pressure, closure valve means in said brake valve for controlling the flow of pressure medium to said pressure line including a hollow valve member having a control valve portion, said closure valve means including also a stem portion extending through said piston means and normally leaving an annular space in communication with said first mentioned space, said hollow valve member being in communication on one side thereof with said pressure line and on the other side thereof with the pressure medium return line, said actuating means including an actuating member and an auxiliary rod operatively connected with the end of the stem portion of said hollow valve member, two sleeve means surrounding said stem portion and actuating rod, means including said actuating rod for displacing said hollow valve member in its function as push member during emergency braking, and means including said two sleeve means for displacing said hollow valve member in its function as control valve, said two sleeve means, upon axial loading thereof, interrupting by the seal means provided at the mutual contact surfaces thereof the connection of the hollow space within the valve member with the return line, the one of said two sleeve means disposed nearer the control valve portion being slidable within said housing means and on the stem portion of said closure valve means and abutting with the end face thereof opposite said control valve portion against a collar of said actuating rod, the other end face of said one sleeve means being of substantially similar cross section as that cross section of the hollow valve member against which acts the servo-pressure with said closure valve means in the closed position thereof so that the hollow valve member follows in the presence of servo-pressure the movements of said one sleeve means whereas, in case of failure of the servo-pressure, said hollow valve member, following the movements of the piston means, is able to move relative to the sleeve means and thus, by overcoming a lost motion existing in the connection to the actuating member, comes under the actuating influence of said actuating member.

9. A brake valve for hydraulic brake actuating installations, especially motor vehicles, having a servo-pressure system with a pressure medium supply, comprising:

housing means provided with port means for connection with the supply line leading to the servo-tank, with the pressure line leading to the wheel brake cylinder, and with the pressure medium return line, piston means slidable within said housing means, said piston means being acted upon on one end face thereof by the servo-pressure and defining with the other end face thereof a space adapted to be connected with the pressure line leading to the wheel brake cylinders, and actuating means operatively connected with said piston means for displacing said piston means in case of failure of the servo-pressure to thereby produce a brake pressure in the pressure line, said piston means being loaded in one direction by the servo-pressure, and spring means for loading the piston means in the opposite direction in such a manner that the piston means is effectively brought by said spring means into the starting position for the production of braking pressure in case of failure of the servo-pressure, closure valve means in said brake valve for controlling the flow of pressure medium to said pressure line including a hollow valve member having a control valve portion, abutment means in said housing means, said piston means being pressed against said abutment means by the servo-pressure, and said piston means simultaneously forming the valve seat for said closure valve means, said closure valve means including also a stem portion extending through said piston means and normally leaving an annular space in communication with said first-mentioned space, and means for pressing said closure valve means against said valve seat in opposition to the direction of flow of the pressure medium coming from the supply line, said closure valve means serving as push member for emergency braking in case of failure of servo-pressure, said closure valve means having an abutment at the stem portion thereof which, upon a relative movement between the closure valve means and the piston means exceeding the normal opening path, abuts sealingly against said one end face of the piston means and thus serves in case of failure of the servo-pressure for the transmission of the movement and of the force from the brake valve actuating member of said brake actuating means to said piston means, said hollow valve member being in communication on one side thereof with said pressure line and on the other side thereof with the pressure medium return line, said actuating means including an actuating member and an auxiliary actuating rod operatively connected with the end of the stem portion of said hollow valve member, two sleeve means surrounding said stem portion and actuating rod, means including said actuating rod for displacing said hollow valve member in its function as push member during emergency braking, and means including said two sleeve means for displacing said hollow valve member in its function as control valve, said two sleeve means, upon axial loading thereof, interrupting by the seal means provided at the mutual contact surfaces thereof the connection of the hollow space within the valve member with the return line, the one of said two sleeve means disposed nearer the control valve portion being slidable within said housing means and on the stem portion of said closure valve means and abutting with the end face thereof opposite said control valve portion against a collar of said actuating rod, the other end face of said one sleeve means being of substantially similar cross section as that cross section of the hollow valve member against which acts the servo-pressure with said closure valve means in the closed position thereof so that the hollow valve member follows in the presence of servo-pressure the movements of said one sleeve means, whereas, in case of failure of the servo-pressure, said hollow valve member, following the movements of the piston means, is able to move relative to the sleeve means and thus, by overcoming a lost motion existing in the connection to the actuating member, comes under the actuating influence of said actuating member.

10. A brake valve assembly for hydraulic brake actuating installations, especially motor vehicles, with wheel brake cylinders, having a servo-system with a pressure medium, comprising:

housing means provided with port means adapted to be connected with the supply, pressure and return lines of the servo-system, valve means in said housing means for controlling the application of servo-pressure to the wheel brake cylinders by way of said pressure line, first actuating means operatively connected with said valve means for controlling said valve means in the presence of servo-pressure, and second actuating means for producing a braking pressure in said pressure line in the absence of servo-pressure including lost motion connecting means and means in said housing means and operative exclusively in response to failure of the servo-pressure for automatically substantially eliminating the lost motion in said connecting means.

11. A brake valve assembly for hydraulic actuating installations, especially motor vehicles, with wheel brake cylinders, having a servo-system with a pressure medium, comprising:
  housing means provided with port means adapted to be connected with the supply, pressure and return lines of the servo-system,
  piston means slidable within said housing means, said piston means being acted upon on one end face thereof by the servo-pressure,
  valve means in said housing means for controlling the application of servo-pressure to the wheel brake cylinders by way of said pressure line,
  first actuating means operatively connected with said valve means for controlling said valve means in the presence of servo-pressure,
  and second actuating means for producing a braking pressure in said pressure line in the absence of servo-pressure including lost motion connecting means and means operative in response to failure of the servo-pressure for automatically substantially eliminating the lost motions in said connecting means, said first actuating means including discharge closure means to enable a build-up of servo-pressure in the wheel brake cylinder and said second actuating means including mechanical actuating means for said first-mentioned valve means.

References Cited by the Examiner

UNITED STATES PATENTS

| 2,318,756 | 5/1943 | Chouings | 188—152 |
| 2,404,122 | 7/1946 | Campbell | 303—54 |
| 2,776,734 | 1/1957 | Hackett | 303—2 |

BENJAMIN HERSH, *Primary Examiner.*

EUGENE G. BOTZ, *Examiner.*

M. S. SALES, *Assistant Examiner.*